(12) United States Patent
Fedyk (10) Patent No.: US 8,811,388 B2
(45) Date of Patent: Aug. 19, 2014

(54) SERVICE INSTANCE APPLIED TO MPLS NETWORKS

(75) Inventor: Donald Fedyk, Groton, MA (US)

(73) Assignee: Rockstar Consortium US LP, Plano, TX (US)

( * ) Notice: Subject to any disclaimer, the term of this patent is extended or adjusted under 35 U.S.C. 154(b) by 761 days.

(21) Appl. No.: 12/412,589

(22) Filed: Mar. 27, 2009

(65) Prior Publication Data

US 2010/0124225 A1 May 20, 2010

Related U.S. Application Data

(60) Provisional application No. 61/114,558, filed on Nov. 14, 2008.

(51) Int. Cl.
*H04L 12/28* (2006.01)
*H04L 12/56* (2006.01)

(52) U.S. Cl.
CPC .............. *H04L 45/50* (2013.01); *H04L 45/306* (2013.01); *H04L 45/16* (2013.01)
USPC ............................ 370/354; 370/390; 370/392

(58) Field of Classification Search
CPC ....... H04L 45/02; H04L 45/026; H04L 45/10; H04L 45/16; H04L 45/306; H04L 45/50; H04L 45/68
See application file for complete search history.

(56) References Cited

U.S. PATENT DOCUMENTS

| | | | |
|---|---|---|---|
| 6,473,421 B1 * | 10/2002 | Tappan | 370/351 |
| 6,483,833 B1 * | 11/2002 | Jagannath et al. | 370/392 |
| 6,683,874 B1 * | 1/2004 | Nagami et al. | 370/392 |
| 7,283,563 B1 * | 10/2007 | Allan | 370/469 |
| 7,839,891 B1 * | 11/2010 | Allan | 370/469 |
| 7,933,197 B2 * | 4/2011 | Bryant et al. | 370/216 |
| 2003/0099194 A1 * | 5/2003 | Lee et al. | 370/229 |
| 2003/0177221 A1 * | 9/2003 | Ould-Brahim et al. | 709/223 |
| 2004/0073694 A1 * | 4/2004 | Frank et al. | 709/232 |
| 2004/0114595 A1 * | 6/2004 | Doukai | 370/389 |

(Continued)

FOREIGN PATENT DOCUMENTS

| | | |
|---|---|---|
| EP | 0087405 | 3/2002 |
| JP | 2004-193644 | 8/2004 |

OTHER PUBLICATIONS

Cisco document ID 13736, Configuring basic MPLS Using OSPF, Aug. 10, 2005, 8 pages.*

(Continued)

*Primary Examiner* — Ayaz Sheikh
*Assistant Examiner* — Mounir Moutaouakil
(74) *Attorney, Agent, or Firm* — Anderson Gorecki & Rouille LLP (57) ABSTRACT

Domain-wide unique node identifiers and domain-wide unique service identifiers are distributed within a MPLS domain using routing system LSAs. Nodes on the MPLS network compute shortest path trees for each destination and install unicast forwarding state based on the calculated trees. Nodes also install multicast connectivity between nodes advertising common interest in a common service identifier. Rather than distributing labels to be used in connection with unicast and multicast connectivity, the nodes deterministically calculate the labels. Any number of label contexts may be calculated. The labels may either be domain wide unique per unicast path or per multicast, or may be locally unique and deterministically calculated to provide forwarding context for the associated path. Multicast and unicast paths may be congruent, although this is not a requirement.

15 Claims, 5 Drawing Sheets

(56) References Cited

U.S. PATENT DOCUMENTS

| | | | |
|---|---|---|---|
| 2006/0203747 | A1 | 9/2006 | Wright et al. |
| 2007/0030852 | A1 | 2/2007 | Szczesniak et al. |
| 2007/0076719 | A1 | 4/2007 | Allan et al. |
| 2007/0165657 | A1 | 7/2007 | Smith et al. |
| 2007/0217420 | A1* | 9/2007 | Raj et al. .................. 370/392 |
| 2008/0019385 | A1 | 1/2008 | Sultan et al. |
| 2008/0043635 | A1* | 2/2008 | Retana et al. ............ 370/252 |
| 2008/0107027 | A1 | 5/2008 | Allan et al. |
| 2009/0052444 | A1* | 2/2009 | Ringen .................... 370/389 |
| 2009/0080437 | A1* | 3/2009 | Nguyen et al. ......... 370/395.31 |
| 2009/0161583 | A1* | 6/2009 | Boers et al. ............. 370/256 |
| 2009/0268731 | A1* | 10/2009 | Narayanan et al. ....... 370/390 |
| 2010/0002576 | A1* | 1/2010 | Hu ........................... 370/217 |

OTHER PUBLICATIONS

Cisco document ID 29220, Multicast support for MPLS VPNs configuration Example, Aug. 10, 2005, 14 pages.*

European Search Report dated Jun. 12, 2012 from corresponding European Patent Application No. 09826575.4.

A. Takacs, et al., *GMPLS Controlled Ethernet: An Emerging Packet-oriented Transport Technology*, IEEE Communications Magazine, vol. 46, No. 9, Sep. 1, 2008, pp. 118-124.

D. Fedyk, et al., *Provider Link State Bridging*, IEEE Draft: aq-fedyk-provider-link-state-bridging-0107-01, Jan. 3, 2007.

D. Fedyk, et al., GMPLS control of Ethernet PBB-TE, IETF Internet Draft: draft-ietf-ccamp-gmpls-ethernet-pbb-te-01.txt, Jul. 14, 2008.

* cited by examiner

SERVICE INSTANCE APPLIED TO MPLS NETWORKS

CROSS-REFERENCE TO RELATED APPLICATIONS

This application claims priority to U.S. Provisional Patent Application Ser. No. 61/114,558 filed Nov. 14, 2008, the content of which is hereby incorporated herein by reference.

TECHNICAL FIELD

The present invention relates to communication networks and, more particularly, to a method and apparatus for enabling a notion of service instance to be applied to MPLS networks.

BACKGROUND

Data communication networks may include various switches, routers, hubs, and other devices coupled to and configured to receive data and forward the data on the network. These devices will be referred to herein as "network elements." A network element is generally not a consumer of the data, but rather is used to receive and forward data so that the data may pass through the network. Data is communicated through a network by enabling the network elements to pass protocol data units, such as frames, packets, cells or segments, between each other over communication links. A particular protocol data unit may be handled by multiple network elements and cross multiple communication links as it travels between its source and its destination over the network.

The various network elements on the communication network communicate with each other using predefined sets of rules, referred to herein as protocols. Different protocols are used to govern different aspects of the communication, such as how signals should be formed for transmission between the network elements, various aspects of what the protocol data units should look like, how protocol data units should be handled or routed through the network by the network elements, and how information such as routing information should be exchanged between the network elements.

In Ethernet network architectures, devices connected to the network compete for the ability to use shared telecommunications paths at any given time. Where multiple bridges or nodes are used to interconnect network segments, multiple potential paths to the same destination often exist. The benefit of this architecture is that it provides path redundancy between bridges and permits capacity to be added to the network in the form of additional links. However to prevent loops from being formed, a spanning tree was generally used to restrict the manner in which traffic was broadcast on the network. Since routes were learned by broadcasting a frame and waiting for a response, and since both the request and response would follow the spanning tree, most if not all of the traffic would follow the links that were part of the spanning tree. This often led to over utilization of the links that were on the spanning tree and underutilization of the links that weren't part of the spanning tree.

To overcome some of the limitations inherent in Ethernet networks, a Provider Link State Bridging network (one example of a link state protocol controlled Ethernet network) was disclosed in application Ser. No. 11/537,775, filed Oct. 2, 2006, entitled "Provider Link State Bridging," the content of which is hereby incorporated herein by reference. PLSB is further described in U.S. patent application Ser. No. 11/702,263, filed Feb. 5, 2007, entitled MULTICAST IMPLEMENTATION IN A LINK STATE PROTOCOL CONTROLLED ETHERNET NETWORK, the content of which is hereby incorporated herein by reference.

PLSB uses a link state protocol such as Intermediate System to Intermediate System (ISIS) to enable the network elements to exchange link state routing information. The nodes use the link state routing information to compute shortest paths through the network. Because shortest path routing is used, a shortest path tree may be computed from each source node to avoid the use of the Spanning Tree Protocol, so that link utilization may be increased on the network.

MPLS networks may be built on Ethernet networks or other communication networks. In an MPLS network, a signaling protocol is used to establish label switched paths through the network, so that traffic may be forwarded across the network on any desired path. In operation, an ingress node (label edge router or LER for short) will receive a packet and determine which path the packet should take through the network. The LER will apply an outer label to the packet and forward it on the Label Switched Path (LSP). Label Switch Routers (LSRs) on the LSP will receive the packet, remove the outer label, use the outer label to determine a next hop for the packet, apply a new outer label to the packet, and forward the packet on the network to the next hop. This outer label will thus be replaced at each hop as the packet passes through the network until the packet reaches its destination.

MPLS establishes unicast connectivity everywhere by establishing Label Switched Paths between pairs of nodes on the MPLS network. Setup of the label switched paths requires labels to be distributed to each of the nodes on the path, so that the nodes can agree on what labels will be used to enable the packet to follow the path through the network. One protocol that is commonly used to establish label switched paths through an MPLS network is commonly referred to as Label Distribution Protocol (LDP), although other signaling protocols have been developed as well. Using a signaling mechanism, labels are established along the label switched paths so that label switch routers can read a label, determine an output for the packet based on the label, and apply a new label to forward the packet along the path through the network. The signaling protocol is used to install the labels and other appropriate forwarding state for the traffic along the path. The Label Switched Paths define unicast connectivity on the MPLS network, which is generally set up in advance indiscriminately.

MPLS also has several different types of labels that are commonly used. Generally, an outer label will be used to define the forwarding context for a particular packet. This label is often replaced hop-by-hop as the packet traverses across the network. Once the packet has reached an area where the forwarding context is implicit, this outer label may be popped off the packet which is commonly referred to as pentultimate hop popping. Forwarding context is commonly deemed implicit at least one hop away from the final destination of the packet and, hence, the term pentultimate has been used to refer to this process. However, the outer label may be removed at any point along the network path where the route becomes implicit. The outer labels are node-specific, which means that they have meaning to a particular node on the network. The outer labels are not globally unique values, but rather may be reused at different parts of the network.

MPLS enables multiple labels to be stacked onto a given packet. Frequently, as mentioned above, the outer label is used to specify forwarding context for the packet. An inner label (Pseudo Wire label) is frequently used to enable the nodes to demultiplex the packet at the egress from the Label Switched Path. To do this, the destination node will assign a Pseudo Wire label for each service instance being handled by that destination node. The destination also will then instruct the other nodes on the network to apply the Pseudo Wire labels to the packets when they enter the network, so that the egress node can use the inner MPLS Pseudo Wire label to determine how to forward the packet. Thus, the egress node will assign Pseudo Wire labels to its service instances and coordinate with the ingress nodes to apply those Pseudo Wire labels to traffic entering the network. Like the outer labels, the inner Pseudo Wire labels are not network unique, but rather are only unique to the particular egress node. Use of inner labels enables many different flows of data to be multiplexed for transmission over a given LSP on the MPLS network.

In operation, a LER will apply both the inner Pseudo Wire label and the outer forwarding label to a packet at the ingress to the MPLS network. The outer label will be used to forward the packet across the network and the inner label may be used by the destination node to forward the packet off the MPLS network. This enables a single lookup to be performed by the ingress LER and enables label switching to be used to forward the packet across the MPLS network and, by the destination node, off of the MPLS network e.g. to a client network.

Once unicast connectivity has been established, through the establishment of a full set of LSPs through the network, multicast connectivity may be built on top of the MPLS network. Unfortunately, building multicast connectivity requires use of a different signaling protocol, which makes multicast slower to set up and more error prone. For example, nodes use a protocol such as Internet Group Management Protocol (IGMP) to join and leave multicast groups, which causes the nodes to add nodes and remove nodes from the multicast tree. As nodes join and leave multicast groups, multicast connectivity is built on the MPLS nodes. Destination nodes that would like to subscribe to the multicast send out a join message and the intermediate nodes use the join messages to determine whether forwarding state should be added for the particular multicast. Building multicast trees one at a time in this manner is time consuming and computationally intensive. Accordingly, it would be advantageous to provide a new way to implement multicast on an MPLS network.

SUMMARY OF THE INVENTION

Domain-wide unique node identifiers and domain-wide unique service identifiers are distributed within a MPLS domain using routing system LSAs. Nodes on the MPLS network compute a shortest path tree for each other node and install unicast forwarding state for each node based on the domain-wide unique node ID. Nodes also install multicast connectivity between nodes advertising common interest in a service identifier. Rather than distributing labels to be used in connection with unicast and multicast connectivity, the nodes deterministically create the labels. The labels may either be domain wide unique per unicast path or per multicast, or may be locally unique and deterministically calculated to provide forwarding context for the associated path. Any number of labels may be used, although in one embodiment at least two label contexts are used—one per service and one per source for multicast, and one per service and one per destination for multicast. More labels may be used as well as long as they are deterministically calculated.

When a packet is received at the MPLS network, the label edge router will determine the destination of the packet on the MPLS network and apply a label to the packet. Where the label is domain-wide unique, the nodes on the MPLS network will forward the packet of the destination without swapping labels at each hop on the network. Where the label is not domain-wide unique, the nodes may perform label swapping to forward the packet across the network. Multicast and unicast paths may be congruent, although this is not a requirement.

BRIEF DESCRIPTION OF THE DRAWINGS

Aspects of the present invention are pointed out with particularity in the appended claims. The present invention is illustrated by way of example in the following drawings in which like references indicate similar elements. The following drawings disclose various embodiments of the present invention for purposes of illustration only and are not intended to limit the scope of the invention. For purposes of clarity, not every component may be labeled in every figure. In the figures:

DETAILED DESCRIPTION

Figure 1:
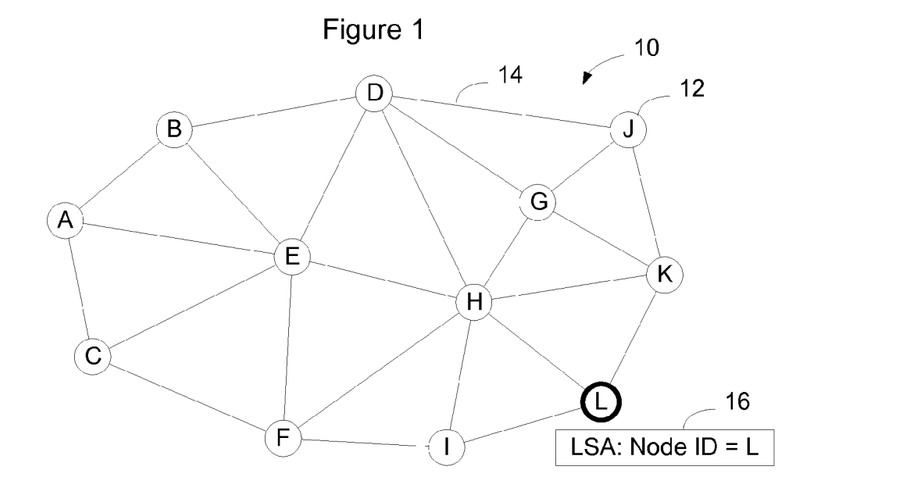
FIG. 1 is a functional block diagram of an example MPLS communication network illustrating advertisement of domain-wide unique node identification by example MPLS node L.

FIG. 1 shows an example MPLS communication network that will be used to explain implementation of an embodiment of the invention. In the embodiment shown in FIG. 1, the MPLS communication network 10 has a plurality of nodes 12 interconnected by links 14. MPLS networks typically run a link state routing protocol such as Open Shortest Path First (OSPF) or Intermediate System to Intermediate System (IS-IS). The routing system enables nodes to send out advertisements to notify the other nodes of the state of the links to which they are connected. These advertisements will be referred to herein as Link State Advertisements (LSAs.). Generally, a LSA will identify not only the node but also its adjacencies. The node listens for LSAs and uses the information contained in the LSAs to build a common view of the topology of the MPLS network, which is stored in the node's Link State Data Base (LSDB). The nodes may then use the Link State Data Base to calculate routes through the MPLS network as required.

In one embodiment, the nodes use the LSA to transmit a domain-wide unique node identification value, referred herein as a "node identifier" or "node ID". The node ID is unique within the domain and is deterministic. The Node ID is used for source and destination identification. In one embodiment, the node ID is a MPLS label that can be used by any other node on the network to forward unicast traffic to the node associated with that node ID. For unicast traffic, the label identifies the destination on the network and, for example, may identify the destination node. For multicast, by contrast, the label is specified by the source node and uniquely identifies the MPLS service instance on the MPLS network. Any number of labels may be used, although in one embodiment at least two label contexts are used—one per service and one per source for multicast, and one per service and one per destination for multicast. More labels may be used as well as long as they are deterministically calculated.

Nodes on the network distribute unique service instances which are used to compute and install forwarding state. Unicast forwarding state is based on a service instance that terminates at the destination node, whereas multicast forwarding state is based on a service instance that originates at a source node. Unicast forwarding state is installed for the unicast service instance from every node to the intended destination node along shortest path trees to the destination node. Multicast forwarding state is installed from the source node to any other node advertising a common interest in the service instance. By basing connectivity on domain-wide unique service instance values, both unicast and multicast connectivity may be established by the nodes in the same way. Additionally, since interest in service instances may be advertised using the routing system, a separate signaling protocol is not required to establish unicast or multicast connectivity on the MPLS network. Forwarding state may be computed deterministically as well, to avoid the use of a label distribution protocols for label distribution. Thus, both multicast and unicast connectivity may be established based on service instances, and the necessary forwarding state for the service instances may be computed rather than signaled. This allows the routing protocol to be used and eliminates the need for several other protocols that are commonly used on MPLS networks.

In one embodiment, the node ID may be used as an outer label to enable traffic to be forwarded to the destination node on the MPLS network. In this embodiment, since the node ID is domain-wide unique, the nodes on the MPLS network may install forwarding state such that any packet labeled with the Node-ID will be switched along the shortest path tree toward the destination. In this embodiment there is no reason for the nodes to switch the label as the packet traverses the network; rather the same label may be used at each hop so that coordination between nodes on the paths is not required to enable traffic to be forwarded through the MPLS network.

In another embodiment, rather than using a domain-wide unique label value for unicast traffic to a destination, the nodes on the network may deterministically create labels to be used to forward data toward each destination on the network. As noted above, each node on the network has a synchronized view of the network topology and will calculate shortest path tree for each node on the network. As part of this calculation, the node may calculate what label should be used to forward traffic on the shortest path tree. Likewise, the node may calculate what labels its neighbors will use when forwarding traffic on the tree to the destination. The nodes may install forwarding state for these labels so that the label space may be reused on the network. However, since the labels are computed rather than signaled, the nodes are not required to use LDP or another label signaling protocol to establish LSPs on the network.

Figure 2:
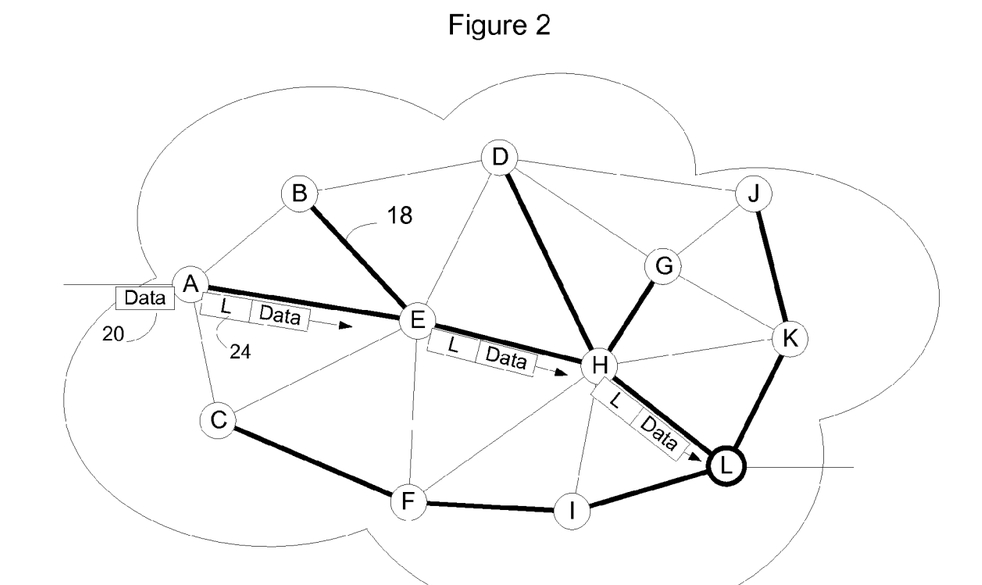
FIG. 2 is a functional block diagram of the example MPLS communication network of FIG. 1, showing example unicast connectivity established to one of the MPLS nodes to enable all nodes on the MPLS network to forward unicast traffic to that MPLS node.

For example, in FIG. 1 node L has transmitted a Link State Advertisement 16 containing a MPLS Label which will serve as Node L's Node ID on the MPLS network. As shown in FIG. 2, the nodes on the MPLS network will use the network topology from the routing system to determine a shortest path tree 18 to each node on the network. The shortest path tree is shown using darker lines in FIG. 2. When the nodes receive a Link State Advertisement containing a node ID, the nodes on the MPLS network will use the routing system to calculate a shortest path tree to the node that transmitted the advertisement. Nodes on the network will also calculate labels to be used to forward traffic along the tree to the node install forwarding state into its forwarding database to enable it to forward packets with the computed MPLS labels to the node. In one embodiment, the node ID may be the label, which may be used by all nodes on the network to forward MPLS traffic toward the node. In this embodiment the nodes will not need to perform label swapping but may simply forward traffic tagged with the Node ID MPLS label toward the destination node. This requires the MPLS label to be domain-wide unique. In another embodiment, if domain-wide unique MPLS labels are not used, the nodes may calculate the labels to be used to forward the traffic and install forwarding state based on the computed labels. In either embodiment, signaling is not required to exchange labels on the network.

In FIG. 1, node L has transmitted a link state advertisement containing node ID=L. The node ID is a MPLS label. Each node will determine if it is on a shortest path tree to node L and, if so, install forwarding state to cause traffic to be forwarded on the tree toward node L. The label may be domain-wide unique and consistent across the network or different labels may be calculated by the nodes and then swapped as the traffic is forward toward the destination.

In operation, when a packet arrives at the edge of the network, the label edge router may perform a lookup and determine that the packet should be forwarded to node L on the network. The label edge router will then attach the label for node L (Node L's node ID) to the packet and forward the packet onto the MPLS network. Each node on the MPLS network has forwarding state that will enable the node to forward the packet on the shortest path tree toward node L.

For example, if node A receives a packet 20, it will perform a lookup to determine how to forward the packet on the network. In this example, node A will determine that the packet should be forwarded to node L. Node A will attach a MPLS label 22 to the packet that identifies node L and forward the packet on the network. Node E will receive the packet, read the label 22, and forward the packet to node H. Note, in this example, that node E does not replace the label but rather uses the same label. Each MPLS node on the network will perform this same process of reading the label 22 and then reapplying the same label to enable the packet to use the same label at each hop on the network. Optionally the label 22 may be popped at the last node H, or elsewhere on the network where forwarding is implicit, in a manner similar to penultimate hop popping. This embodiment provides relatively simple operation from a label calculation standpoint, since each node uses the same label to forward the traffic to the destination. The invention is not limited in this manner as other label calculation processes may be used as well that will enable the nodes to calculate the labels to be used to forward traffic on the MPLS paths.

Transmitting a domain-wide unique node ID in the form of an MPLS label, and then using the routing system to install forwarding state for that label/node binding, enables unicast connectivity to be established on the MPLS network without requiring separate label switched paths to be signaled on the network. Typically, the node L would need to establish separate label switched paths with each of the other nodes on the network. By using the routing system to establish unicast connectivity, traditional LSP signaling may be eliminated.

Multicast connectivity may also be implemented by introducing a notion of a service instance to the MPLS network. As used herein, the term "service instance" will be used to refer to a multicast or unicast group of interest. Nodes on the network may advertise interest in a service instance using a routing system link state advertisement. The service instance, like the Node ID, is a MPLS label and is a domain-wide unique value. Nodes on a service instance advertise their interest in the service instance using IS-IS LSAs. Whereas the node ID identifies the destination node, in a multicast context the service identifier identifies the source of the multicast.

When a node on the MPLS network receives a LSA containing a service instance, it will determine whether it is on a shortest path between a node advertising interest in the service ID and the source node associated with the service instance. Any node that is on a shortest path between the source of the multicast and another node advertising common interest in the same service instance will install forwarding state for the service instance in their forwarding database. Since the service instance is a MPLS label, installing forwarding state for the service instance will enable the node to forward any packets tagged with the service instance label on the shortest path through the MPLS network. Thus, MPLS multicast connectivity may be created simply by causing nodes to advertise interest in the service instance. The MPLS nodes on the network may then create the paths for the multicast tree deterministically, without requiring the multicast tree to be separately signaled on the network. Thus, MPLS multicast may be established at the same time as unicast and using the same mechanisms, without requiring the use of LDP or other protocol to exchange labels, and without requiring the use of a separate multicast group management protocol such as IGMP.

Figure 3:
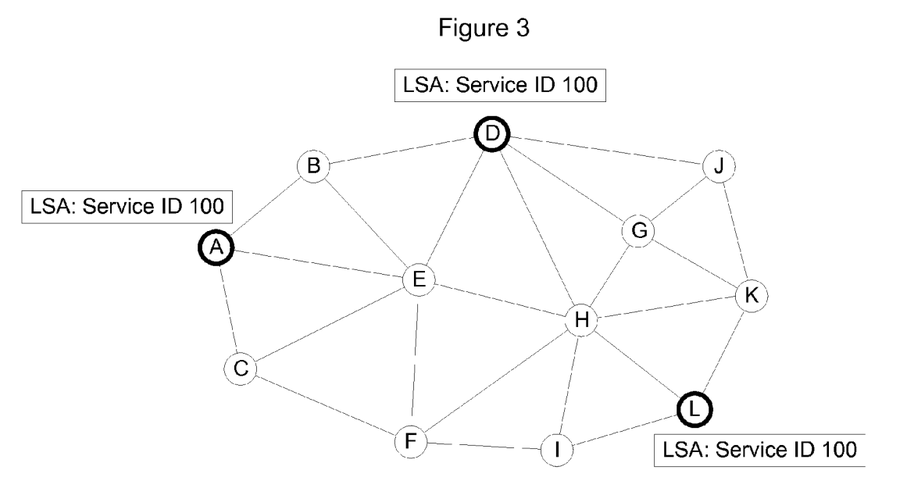
FIG. 3 is a functional block diagram of the example MPLS communication network of FIG. 1, showing advertisement of interest in a common service instance by several MPLS nodes.

For example, in FIG. 3 assume that service instance 100 will be a multicast flow of traffic originating at node L. Node L will advertise interest in the service instance=100 so that all nodes on the network know that node L is the source of a multicast with service ID=100. The service instance ID is the multicast label that node L will use to transmit multicast traffic on to the MPLS network.

Figure 4:
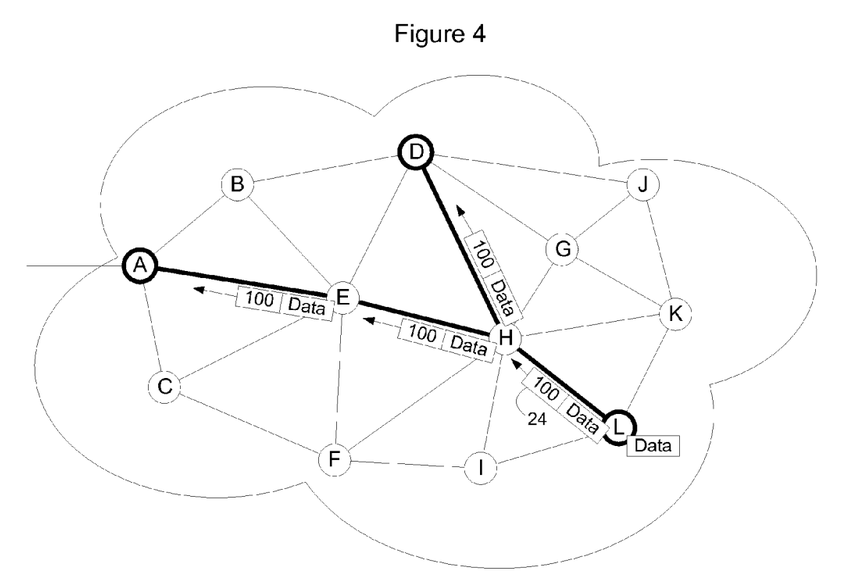
FIG. 4 is a functional block diagram of the example MPLS communication network of FIG. 1, showing example multicast connectivity established between the MPLS nodes that have advertised interest in the common service instance.

In the example shown in FIG. 3, assume that Node A and Node D would like to receive the multicast traffic associated with service instance=100. Each of these nodes will transmit a link state advertisement containing the service ID of the multicast that they are interested in joining. Accordingly, nodes A and D will transmit a LSA containing service ID=100. The link state advertisement will be flooded on the MPLS network. Each node that receives the link state advertisement will look to see whether it is on a shortest path between the source of the multicast and a leaf node advertising common interest in the same service instance. Node E, for example, will determine that it is on a shortest path between node A and node L and install forwarding state for the multicast label associated with the service instance into its forwarding table. Similarly, node H will determine that it is on a shortest path between node A and node L, and that it is on a shortest path between node D and node L. Accordingly, node H will install forwarding state to cause traffic received from node L to be replicated and output over two ports—one port to D and one port to A. The example multicast tree is shown using thicker lines in FIG. 4.

Each node on the network will calculate service labels for the multicast and install forwarding state for the multicast as appropriate. The multicast may use a domain-wide unique multicast MPLS label that uniquely identifies the multicast on the MPLS network. In this embodiment the nodes are not required to perform label swapping but may rather all install forwarding state for the domain-wide unique MPLS label. Alternatively, the nodes may calculate labels to be used for the multicast and install forwarding state for the calculated labels.

When node L receives a packet that is associated with the multicast, it will attach a label 24 to the packet to identify the packet as part of service instance 100. Optionally, the node may also attach a second label identifying the source node (using the source Node ID) and use that as an outer label. Once the label(s) have been applied, node L will then forward the multicast packet on the network. When node H receives the packet, it will read the label and perform a lookup to determine over which port or ports it should forward the packet. Node H will determine that it should forward the packet towards Node E and Node D, and will replicate the packet and output the packet on ports toward those nodes. If a globally unique label is being used for the service instance, node H will apply the same label to the packet as was attached to the packet when it arrived so that the packet will use the same label at each hop on the network. Otherwise, if labels have been calculated deterministically, the node will swap the original label for the new label before forwarding the packet on the network. Where forwarding state is implicit, such as on the link between node H and node D, the label may be popped. Forwarding may be performed based on the service label alone or based on the combination of service label and source label where a source label is used.

According to an embodiment of the invention, the service labels used to create multicast and unicast paths are computed deterministically. This enables the MPLS paths to be created without requiring the paths to be signaled using a separate signaling protocol—the routing protocol is able to be used to set up and tear down the paths. In one embodiment, MPLS multicast uses a label space for every root of the tree. When it does that it uses an upstream defined label. The source must be advertised by a unique identifier that fits in an MPLS label space of 20 or less bits. The label space is identified by a context which may be an outer label. A node can compute an outer label space per source node out of the per platform space. Each node computes a node identifier so that a node identifier is created on all destinations.

Multicast operation: Multicast packets include two labels: an outer label from per platform space that is the same on all nodes, and an inner label which provides source "node identifier". The inner label is a domain-wide label. The inner label is based on a per source basis and only installed on nodes in the domain that support this multicast tree. The domain wide unique inner label is based on "service identifier".

All nodes do all pairs shortest path computation creating a tree from each source. When a node lies on the shortest path between two destinations advertising interest in a particular service instance, the node installs a label space for the source node and each service identifier that goes through the node.

The forwarding operation includes reading the MPLS multicast context and then looking up the per source label space based on the node identifier. The outer label may be removed, but the second (inner) label determines the set of egress ports. The outer label may be added back and the packet is replicated for each outgoing port.

Unicast operation: Unicast packets similarly include the same two labels. The outer label is a Domain wide unique label based on destination "node identifier". Alternatively, the labels on the unicast path may be computed deterministically. The inner label is based on a per destination basis and is only examined on egress.

All inner and outer labels and/or label contexts are distributed via ISIS. All nodes do all pairs shortest path computation creating a tree from each source. When a node lies on the shortest path between two destinations the node installs a destination label for the destination node provided there is a service identifier in common. Service identifiers may be identified as sources or sinks in the control plane and therefore can create unidirectional traffic. Services may combine multiple service identifiers. Service Identifiers may be associated with unique topology identifiers.

Optionally, in one embodiment, unicast paths will be congruent with multicast, provided all computations are uniquely deterministic. The invention is not limited in this manner, however, as different processes of determining paths through the network may be used for unicast than are used for multicast. While shortest path trees have been used, this works for all forms of trees that are deterministic. Thus, other types of deterministic trees may be used instead of shortest path trees. Additionally, multipath is available if some of the "node identifier" label bits are used to identify different paths creating identifiers for equal trees.

Traffic engineered MPLS could use labels similar to Multicast labels that define point to point or point to multipoint labels. The service label space must split to allow traffic engineered services. Service labels can be defined as sources and sinks and also as traffic engineered or not traffic engineered. Additional information about bandwidth and paths would have to be advertised in the link state advertisements to enable the traffic engineered paths to be set up across the network.

The organization of Service identifier which is for both multicast and unicast, and then mapping the services at the edge to these groups, provides a multicast enabled topology from the start, rather than as an afterthought.

Creating Service instances allows the multicast service to be described such that simplified signaling (i.e. using ISIS Link State Advertisements) is all that is needed. Moving all advertising of service groups to link state allows the model to move from the current model of signaling, to one of computation, enabling fast convergence with no signaling. MPLS currently uses label distribution protocols to create label switched paths. By using service instances, it is possible to eliminate label distribution signaling to provide an Ethernet-like service model, with tailorable multicast and unicast, and ensure proper connectivity of Ethernet PBB services by an MPLS core.

Figure 5:
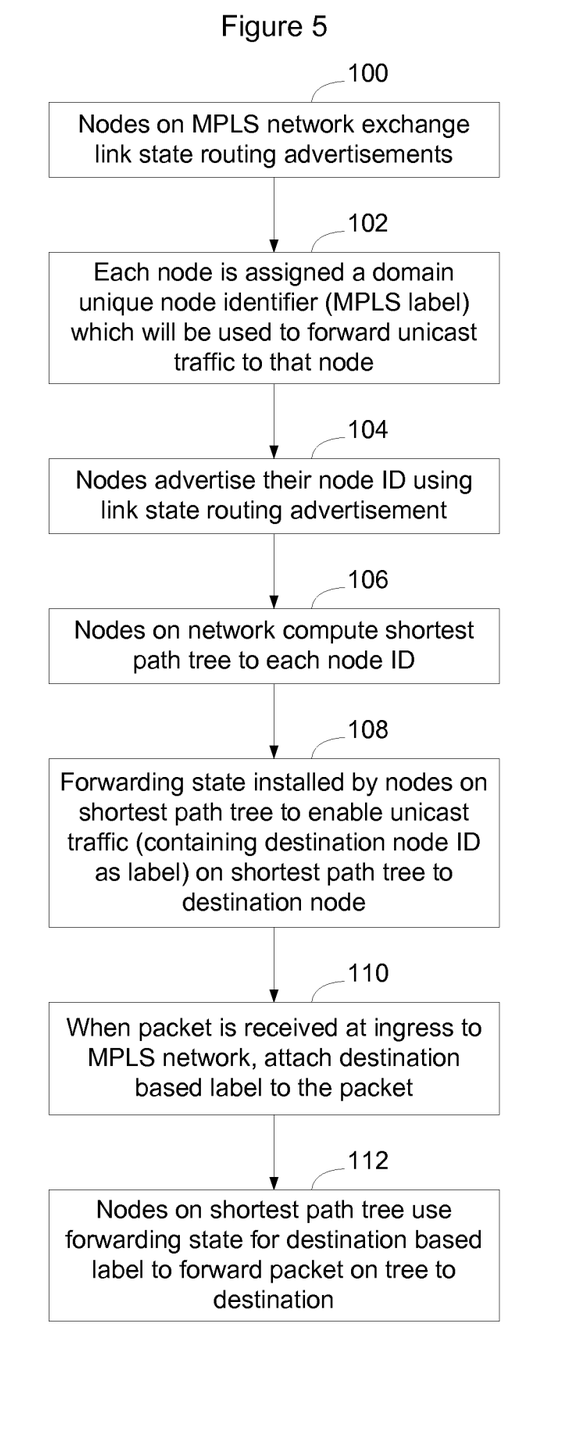
FIG. 5 is a flow chart of a process that may be used to establish unicast connectivity on a MPLS network such as the example MPLS network shown in FIGS. 1-4.

FIG. 5 shows a flowchart of a process of establishing unicast connectivity on an MPLS network according to an embodiment of the invention. As shown in FIG. 5, nodes on the MPLS network exchange link state routing advertisements (100) to enable each node to have a synchronized view of the network topology. Each node on the network is assigned a domain-wide node ID (MPLS label) that will be used to forward unicast traffic to that node (102). The nodes advertise their node ID using a link state advertisement (104) and nodes on the network compute the shortest path tree to each node (106). The nodes will then install forwarding state on the shortest path tree, to enable unicast traffic containing the destination node ID as a label to be forwarded on shortest path tree to the destination (108). The node ID may be used on the forwarding label or the node may deterministically compute the forwarding labels that will be used by the upstream node on the tree and to deterministically compute the forwarding label that it should use to forward traffic toward the destination. When a packet is received at the ingress to the MPLS network, a destination based label will be attached to the packet (110). This label will be based on the destination node ID. The ingress node will then forward the packet onto the MPLS network and the nodes on the shortest path tree will forward the packet across the MPLS network to the egress node (112).

Figure 6:
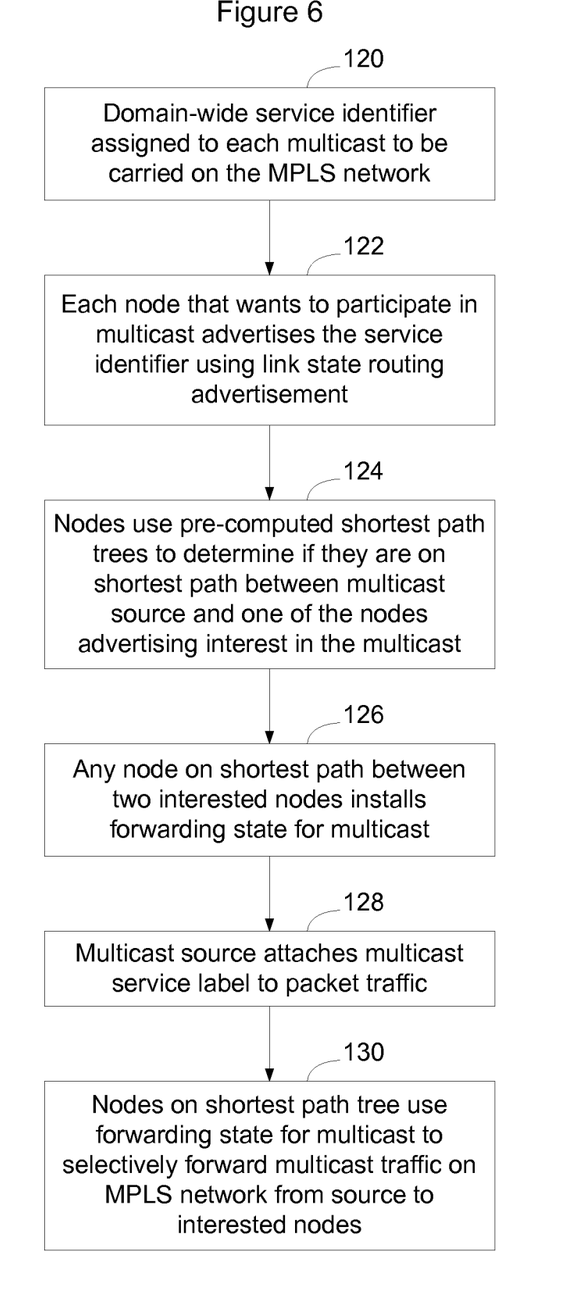
FIG. 6 is a flow chart of a process that may be used to establish multicast connectivity on a MPLS network such as the example MPLS network shown in FIGS. 1-4.

FIG. 6 is a flowchart of a process of establishing multicast connectivity on an MPLS network according to an embodiment of the invention. As shown in FIG. 6, a domain-wide service identifier is assigned to each multicast to be carried on the MPLS network (120). Each node that wants to participate in a multicast advertises the service identifier using a link state routing advertisement (122). Nodes use pre-computed shortest path trees to determine whether they are on a shortest path between the multicast source and one or more of the nodes advertising interest in the multicast (124). Any node on a shortest path between two nodes advertising a common interest in the same service instance will install forwarding state for that service instance (126). When traffic arrives to be carried on the multicast tree, the ingress node will attach a multicast service label to each packet and forward the packets onto the MPLS network (128). The nodes on the MPLS network will use the forwarding state for the multicast to selectively forward the multicast traffic on the MPLS network from the source node to the other nodes interested in receiving that traffic (130).

Figure 7:
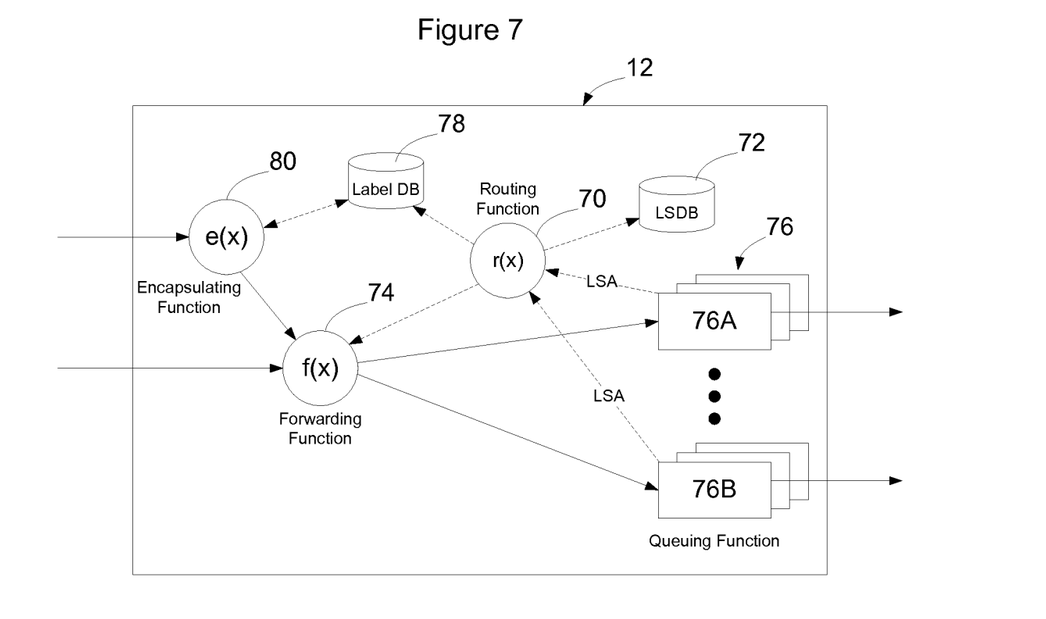
FIG. 7 is a functional block diagram of an example MPLS node that may be used to implement an embodiment of the invention.

FIG. 7 shows a functional block diagram of an example MPLS network element. As shown in FIG. 7, the MPLS network element includes a routing function 70 that receives link state advertisements from other nodes and uses the link state advertisements to generate a link state database 72. The link state database contains information about the network topology and is used by the network element to calculate shortest path trees rooted at each node of the network.

According to an embodiment of the invention, the routing function also receives label information from the link state advertisements and uses the label information to program a forwarding function 74. The label information includes node identifiers, which are labels identifying the nodes on the network, and service identifiers, which are labels identifying service instances on the network.

When the routing function receives a link state advertisement containing a node ID, it will install forwarding state into the forwarding function to enable traffic labeled with the node ID to be forwarded to the correct output port, so that the traffic will follow the shortest path tree to the destination node on the network. In operation, the forwarding function will read the label to determine the next hop for the traffic and forward the traffic to a queuing function 76 for the appropriate port that is connected to the determined next hop. The service label may be applied by the forwarding function or the queuing function before the packet is transmitted.

When the routing function receives a link state advertisement containing a service ID, it will update its link state database to include an association between the service ID and the node which issued the link state advertisement. The routing function will also search its link state database for other nodes that have also advertised interest in the same service ID. The node will then install forwarding state for the service instance into the forwarding function whenever the node is on a shortest path tree between two nodes advertising a common interest in the same service instance.

Where the network element 12 is a label edge router, the routing function can also maintain a label database 78 that will be used by an encapsulating function 80 to label traffic as it arrives on the network. When a packet arrives at the network element 12 from outside of the MPLS network, the packet will be classified and a label will be attached. Where the packet is a unicast packet, a destination label will be obtained for the unicast packet and added by the encapsulation function. Where the packet is a multicast packet, a source based multicast label will be obtained for the multicast packet and added by the encapsulation function. Optionally, the encapsulation function may also add one or more inner labels to the packet. The encapsulated packet will then be sent to the forwarding function to be forwarded out the appropriate port onto the MPLS network.

The functions described above may be implemented as a set of program instructions that are stored in a computer readable memory and executed on one or more processors on the computer platform. However, it will be apparent to a skilled artisan that all logic described herein can be embodied using discrete components, integrated circuitry such as an Application Specific Integrated Circuit (ASIC), programmable logic used in conjunction with a programmable logic device such as a Field Programmable Gate Array (FPGA) or microprocessor, a state machine, or any other device including any combination thereof. Programmable logic can be fixed temporarily or permanently in a tangible medium such as a read-only memory chip, a computer memory, a disk, or other storage medium. All such embodiments are intended to fall within the scope of the present invention.

It should be understood that various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense.

What is claimed is:

1. A method of enabling a service instance to be applied to an MPLS network, the method comprising the steps of:
   exchanging routing advertisements by network elements in the MPLS network to enable the network elements to have a synchronized view of a topology of the MPLS network;
   advertising, by a first MPLS network element on the MPLS network, a domain-wide unique service identifier in one of the routing advertisements; and
   locally calculating, by a second MPLS network element from the second MPLS network element's synchronized view of the topology of the MPLS network, whether to install MPLS label forwarding state for the service identifier by determining whether the MPLS network element is on a shortest path tree rooted at the first MPLS network element, the MPLS label forwarding state being locally calculated by the second MPLS network element and including a first computed label to be used by the second MPLS network element to forward traffic on the shortest path tree to a destination, the MPLS label forwarding state further including at least a second computed label that a MPLS neighbor network element will use when forwarding traffic to on the shortest path tree to the destination.

2. The method of claim 1, wherein the domain-wide unique service identifier is a domain-wide unique network element node identifier.

3. The method of claim 2, wherein the node identifier is a domain-wide unique MPLS label.

4. The method of claim 3, wherein the domain-wide unique MPLS label may be used to forward unicast traffic to the first network element on the MPLS network.

5. The method of claim 4, wherein, if the second MPLS network element installs forwarding state for the service identifier, the second MPLS network element will install forwarding state for the domain-wide unique MPLS label such that any packet received by the second MPLS network element containing the domain-wide unique MPLS label will be forwarded toward the first MPLS network element.

6. The method of claim 1, wherein the first computed label is a domain-wide unique MPLS label that may be used to forward traffic associated with the service instance.

7. The method of claim 6, wherein the domain-wide unique MPLS label is a unicast label associated with the destination on the MPLS network.

8. The method of claim 6, wherein the domain-wide unique MPLS label is a multicast label associated with a source of the multicast.

9. The method of claim 1, wherein the MPLS labels are calculated in a deterministic manner.

10. The method of claim 1, wherein the step of calculating whether to install MPLS forwarding state includes determining whether the same service identifier has been advertised by a third MPLS network element on the MPLS network and if so, determining whether the second MPLS network element is on a forwarding path between the first MPLS network element and the third MPLS network element.

11. The method of claim 10, wherein the third network element is multicast source associated with the service identifier, and wherein the first network element is a multicast subscriber associated with the service identifier.

12. The method of claim 10, wherein the forwarding path is a shortest path between the first MPLS network element and the third MPLS network element.

13. A method of enabling a service instance to be applied to an MPLS network, the method comprising the steps of:
   advertising, by a subset of the MPLS network elements on the MPLS network, interest in a multicast service instance, the multicast service instance being a domain-wide unique value;
   selectively installing, by each of the other network elements on the MPLS network, MPLS label forwarding state for the multicast service instance, if the other network element is on a shortest path between two network elements advertising common interest in the same multicast service instance;
   wherein, at each of the other network elements that installs MPLS label forwarding state, the MPLS label forwarding state is locally calculated by the network element that is installing MPLS forwarding state, and the MPLS label forwarding state includes a first computed label to be used by the network element that is installing MPLS forwarding state to forward traffic associated with the multicast service instance, the MPLS label forwarding state further including at least a second computed label that a MPLS neighbor network element will use when forwarding traffic associated with the multicast service instance;
   wherein the step of advertising is implemented via a link state routing system in use on the MPLS network.

14. The method of claim 13, wherein the MPLS forwarding state includes a domain-wide unique label associated with the service instance.

15. The method of claim 13, wherein the MPLS forwarding state is deterministically calculated by each of the network elements of the MPLS network.

* * * * *